Patented Apr. 7, 1931

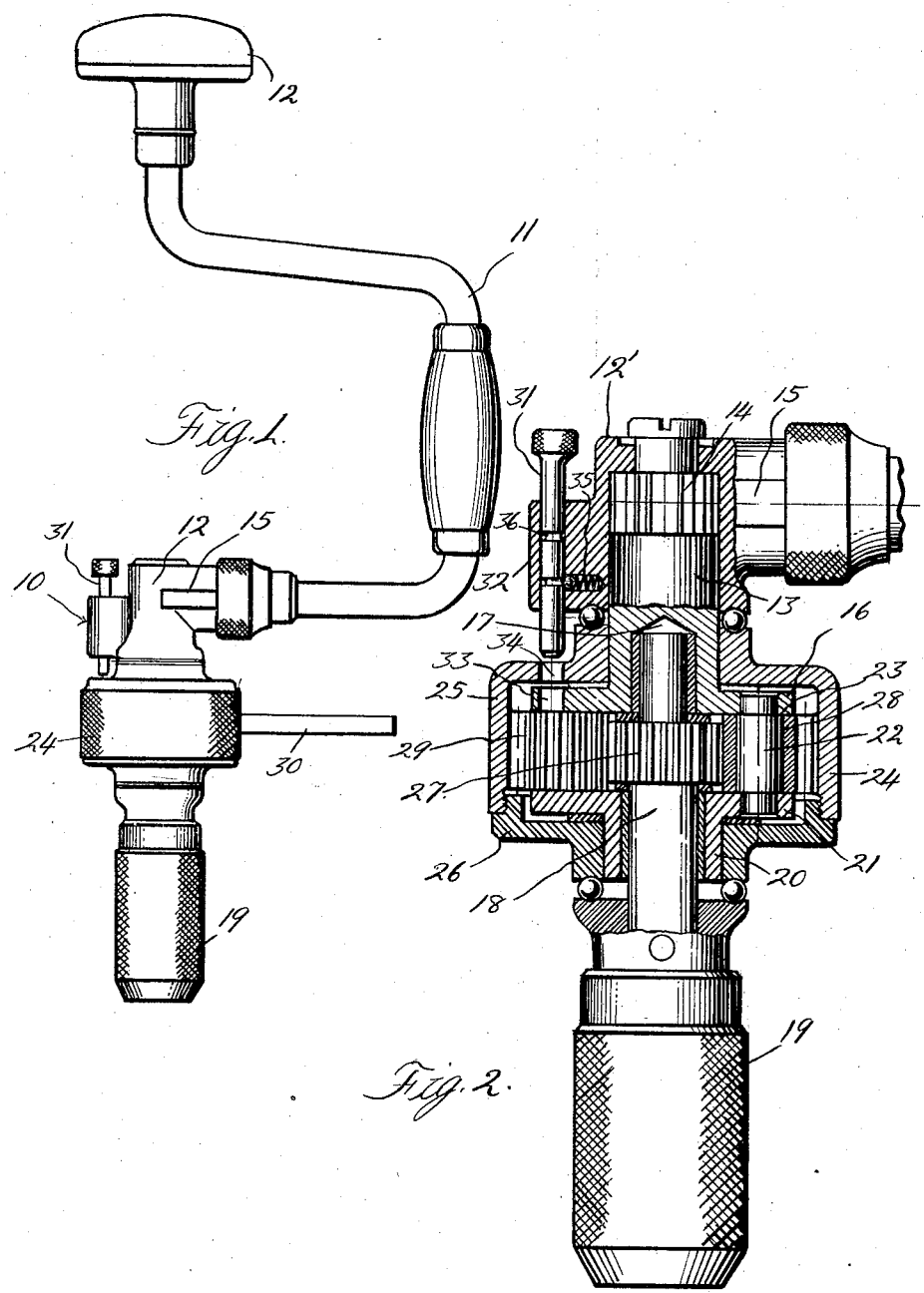

1,799,393

UNITED STATES PATENT OFFICE

ANDREW E. RYLANDER, OF DETROIT, MICHIGAN, ASSIGNOR TO JOSEPH H. HUNTER, OF BLOOMFIELD HILLS, MICHIGAN

BRACE DRILL

Application filed August 26, 1929. Serial No. 388,514.

This invention relates generally to improvements in tool actuating apparatus and has particular reference to hand drilling machines of the crank type commonly known in the trade as bit braces.

One of the primary objects of this invention is to provide a brace of the above type having variable speed means associated therewith for rotating the tool at different speeds.

A further advantageous feature of the present invention resides in the provision of a variable speed brace wherein the hand or breast pad is positioned in alignment with the axis of the tool actuating spindle and wherein the crank is adapted to rotate about this axis to actuate the spindle. This arrangement is desirable since it tends to eliminate undue twisting and chattering common in a great many hand drills as now commercially produced where the crank operates at right angles to the axis of the spindle.

With the foregoing as well as other objects in view, the invention consists in the novel features of construction and arrangements of parts which will be more fully hereinafter set forth, especially when considered in connection with the accompanying drawing, wherein:

Figure 1 is a side elevational view of a brace having variable speed mechanism associated therewith; and Figure 2 is a fragmentary sectional view through the brace shown in Figure 1.

Referring now to the drawing, it will be noted that there is illustrated in Figure 1 a brace 10 having a crank 11 terminating at its upper end in a breast or hand pad 12 and at its lower end in a hub portion 12' forming a journal for the crank pin 13. The crank pin 13 is provided at its upper end with a ratchet portion 14 adapted for engagement with a ratchet dog 15 carried by the hub portion 12' of the crank. The arrangement is such as to permit partial progressive movement of the crank when conditions prohibit complete rotation of the same. The lower end of the crank pin 13 terminates in an annular flange 16 and is provided with a centrally arranged bore 17 forming a journal for the upper end of the tool actuating spindle 18. The lower end of the spindle 18 is connected in any suitable manner to a tool holding member or chuck 19. The intermediate portions of the spindle are preferably journaled in a bearing member 20 terminating at the upper end thereof in an annular flange 21 corresponding in dimension and spaced from the flange 16 on the crank pin. The two flanges 16 and 21 are preferably secured together by means of a pin 22 extending through the flanges adjacent the periphery thereof and provided with longitudinally spaced shoulders 23 forming abutments for the flanges to maintain the same in proper spaced relation to each other.

For establishing a driving connection between the crank pin and spindle I provide a selective variable speed planetary transmission which consists in a housing 24 having a body portion 25 journaled upon the crank pin 13 above the flange 16 and having a cover portion 26 rotatably mounted upon the journal member 20 for the spindle. Incased within the housing 24 is the planetary gearing comprising a sun gear 27 secured to the spindle 18 between the flanges 16 and 21 and adapted to mesh with a planet gear 28 mounted upon the pin 22. The planet gear, in addition to meshing with the gear 27, is adapted to mesh with a series of teeth 29 extending inwardly from the side walls of the housing. The arrangement is such that when the housing is held from rotation during actuation of the brace by either gripping the knurled outer surface of the housing or by grasping the handle 30 extending from the housing, the spindle 18 will be driven at an accelerated speed owing to the gearing hereinbefore described. On the other hand, if the housing is caused to rotate as a unit with the crank pin 13, the drive will be transmitted directly from the plate 16 to the spindle 18 with the result that the spindle will be rotated at the same annular speed as the crank.

For interlocking the gears in the transmission so as to permit the housing to rotate as a unit with the crank pin 13, I provide a locking pin 31. As shown in Figure 2 of the drawing, the locking pin is mounted for longitudinal sliding movement within an extension 32 formed upon the hub portion 12 of the crank for engagement with a pair of aligned apertures 33 and 34 formed in the flange 16 adjacent the periphery thereof and the top wall of the housing respectively. The construction is such that when the pin is moved to its lowermost position the end portions thereof will engage within the openings 33 and 34 and as a consequence, lock the housing to the crank. When, on the other hand, the plunger is in its uppermost position as shown in Figure 2, the housing may be held from rotation to effect operation of the planetary gearing for accelerating the speed of the spindle. The pin 31 is held in its various positions of adjustment by means of a spring pressed plunger 35 adapted to selectively engage in grooves 36 formed in the locking pin.

Thus from the foregoing it will be apparent that I have provided a selective variable speed transmission for a brace wherein the crank pin and tool actuating spindle rotate about a common axis. It will further be apparent that I have provided a tool of the above type which may be formed of comparatively few parts and one which may be manufactured and assembled with facility.

What I claim as my invention is:

A brace having in combination, a crank provided with a hub portion having a lateral extension formed with a longitudinal bore, a crank pin journaled in and connected to the hub portion, a spindle adapted to be connected to a tool, means for driving said spindle at variable speeds from the crank including a gear secured to said spindle, a second gear carried by the crank pin and meshing with the gear aforesaid, a housing inclosing said gears and having teeth thereon meshing with the teeth on said second gear, said housing being so mounted on said crank pin as to permit rotation of the pin relative thereto, and an adjustable locking pin located in the longitudinal bore of said extension and adapted to engage said housing for connecting the housing to the crank for rotation therewith.

In testimony whereof I affix my signature.

ANDREW E. RYLANDER.